UNITED STATES PATENT OFFICE.

WALDO G. MORSE, OF YONKERS, NEW YORK.

COMPOSITION OF MATTER.

1,392,074. Specification of Letters Patent. Patented Sept. 27, 1921.

No Drawing. Application filed March 12, 1920. Serial No. 365,229.

*To all whom it may concern:*

Be it known that I, WALDO G. MORSE, a citizen of the United States, residing in the city of Yonkers, county of Westchester, and State of New York, have invented a certain new and useful Composition of Matter, of which the following is a specification.

My invention relates to a composition of matter for use as a paint, roofing cement, putty or the like, and has for its objects the production at small cost of such a material so constituted that it will remain in the liquid or plastic state ready for use and in the plastic state and while standing will not separate as is the case with the well known putties, allowing the oils to come to the surface and form a film or skin over the surface as in putty.

A further object is to produce a putty and a cement which will remain in plastic condition for a much longer period than the putties made with whiting and oil together with marble dust or other admixtures, and which will not crumble.

With these and other objects in view, my invention consists in the novel combination of ingredients and compounds to be more fully set forth hereinafter and described in the specification.

In carrying out my invention I employ a mixture of clay, marl and oil.

The preferred clay or kaolin is a silicate of aluminum, preferably white or pipe clay so-called. The preferred marl is a shell marl so-called rich in carbonate of lime and the preferred oil is raw linseed oil, but the so-called putty oil, or various combinations of mineral, animal or vegetable oils known in the paint and putty industries may be employed.

Instead of using white pipe clay, ordinary clays may be employed, and varying types of marl may be used.

As a concrete example of putty compounded in accordance with my invention, I may employ one part of pipe clay, not too fat, and two parts of marl, with oil sufficient to form a mass to the desired consistency. The proportions above specified may be varied to secure various results without departing from my invention.

For paints or roofing cement the proportion of oil may be increased, and for paints a lighter oil may be used.

The clay should preferably be of light color, as should be the marl when used. Marl which has been exposed to the action of subterranean water whereby its structure is largely disintegrated by the water and its contained solvents is preferred.

The clay and marl are finely ground and thoroughly mixed together into the oil as in the manufacture of putty and paint.

In accordance with the provisions of the patent statute, I have described my invention together with the composition of matter, which I consider to represent one embodiment thereof, but I desire it to be understood that my invention is not limited, and that the proportions of the compound used may be varied without departing from the spirit of my invention.

Having now described my invention, what I claim and desire to secure by Letters Patent is:—

1. A composition of matter, comprising equal parts of silicate of aluminum, and marl, and oil.

2. A composition of matter, comprising equal parts of silicate of aluminum, and marl, and a vegetable oil.

3. A composition of matter, comprising equal parts of silicate of aluminum and marl, and linseed oil.

4. A composition of matter comprising equal parts of kaolin and marl, and a binder.

5. A composition of matter comprising equal parts of kaolin and marl, and linseed oil.

6. A composition of matter comprising one part of kaolin, two parts of marl, and oil sufficient to produce conglomeration.

7. A composition of matter comprising kaolin, marl and a binder.

This specification signed this 11th day of March, 1920.

WALDO G. MORSE.